United States Patent [19]

Herd et al.

[11] Patent Number: 4,591,634
[45] Date of Patent: May 27, 1986

[54] TRISAZO/AZOXY DYESTUFF MIXTURES

[75] Inventors: Karl J. Herd, Cologne; Horst Nickel, Leverkusen, both of Fed. Rep. of Germany

[73] Assignee: Bayer Aktiengesellschaft, Leverkusen, Fed. Rep. of Germany

[21] Appl. No.: 755,037

[22] Filed: Jul. 15, 1985

Related U.S. Application Data

[63] Continuation of Ser. No. 267,812, May 27, 1981, abandoned.

[30] Foreign Application Priority Data

Jun. 12, 1980 [DE] Fed. Rep. of Germany ....... 3021979

[51] Int. Cl.⁴ .................... C07C 105/00; C09B 43/10; C09B 27/00; C09B 46/00
[52] U.S. Cl. ........................ 534/570; 8/641; 534/810; 534/811; 534/812; 534/815; 534/585; 534/572
[58] Field of Search ............... 534/570, 810, 811, 812; 11/815; 8/641

[56] References Cited

U.S. PATENT DOCUMENTS

| | | | |
|---|---|---|---|
| 483,368 | 9/1892 | Rosenstiehl | 260/143 |
| 536,532 | 3/1895 | Kirchhoff | 260/169 |
| 536,880 | 4/1895 | Kirchhoff | 260/169 |
| 1,853,501 | 4/1932 | Bormann | 260/143 X |
| 2,180,776 | 11/1939 | Straub et al. | 260/143 |
| 2,203,196 | 6/1940 | Hanhart | 260/143 |
| 2,212,590 | 8/1940 | Delfs et al. | 260/143 |
| 2,286,714 | 6/1942 | Chechak | 260/169 X |
| 3,840,514 | 10/1974 | Sailer et al. | 260/143 |
| 4,009,156 | 2/1977 | Kramb | 260/169 |
| 4,052,380 | 10/1977 | Gaetani et al. | 260/169 |

FOREIGN PATENT DOCUMENTS

| | | | |
|---|---|---|---|
| 515030 | 12/1930 | Fed. Rep. of Germany | 260/143 |
| 2622517 | 12/1977 | Fed. Rep. of Germany | 260/169 |
| 936233 | 7/1948 | France | 260/143 |
| 656507 | 8/1951 | United Kingdom | 260/143 |

*Primary Examiner*—Floyd D. Higel
*Attorney, Agent, or Firm*—Sprung Horn Kramer & Woods

[57] ABSTRACT

Trisazo/azoxy dyestuff mixtures which in the form of free acid correspond to the formula

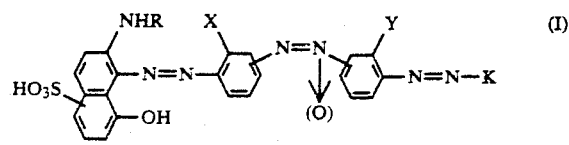

in which R denotes H or optionally substituted alkyl, X and Y denote H, alkyl, alkoxy, halogen, hydroxyl, alkylsulphonyl, optionally mono- or di-alkyl-substituted sulphamyl, carboxyl and carboxyalkoxy and K denotes the radical of a coupling component, are outstandingly suitable for dyeing fibre materials containing hydroxyl groups and fibre materials containing amide groups, such as cotton, natural and synthetic polyamide, paper and leather. They give dyeings having good build-up capacity and good combinability.

1 Claim, No Drawings

TRISAZO/AZOXY DYESTUFF MIXTURES

This is a continuation of application Ser. No. 267,812, filed 5/27/81 (now abandoned).

The invention relates to trisazo/azoxy dyestuff mixtures which in the form of the free acid can be represented by the formula

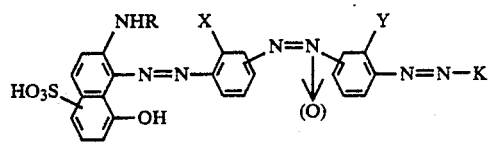
(I)

in which
R denotes H or optionally substituted alkyl,
X and Y denote H, alkyl, alkoxy, halogen, hydroxyl, alkylsulphonyl, optionally mono- or di-alkylsubstituted sulphamyl, carboxyl and carboxyalkoxy and
K denotes the radical of a coupling component.

K for example represents a coupling component from the hydroxybenzenesulphonic acid, hydroxybenzenecarboxylic acid, pyrazole or indole series, but especially the naphtholsulphonic acid series.

Trisazo/azoxy dyestuff mixtures which in the form of the free acid correspond to the formula

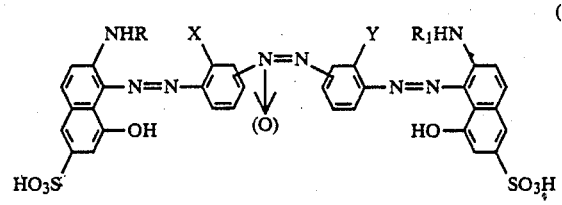
(II)

in which
R, X and Y have the abovementioned meaning and
$R_1$ represents hydrogen or optionally substituted alkyl, are of particular importance.

Trisazo/azoxy dyestuff mixtures of the formulae (III), (IV) or (V)

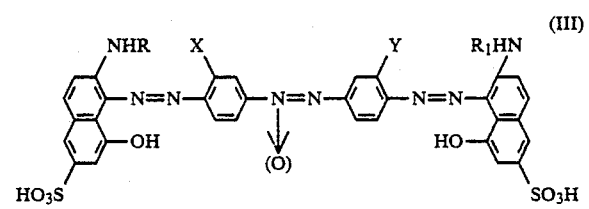
(III)

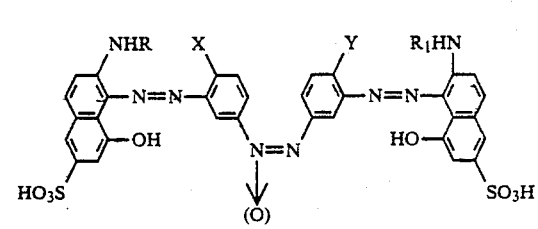
(IV)

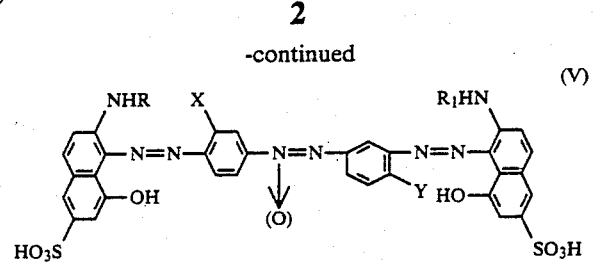
(V)

in which
R, $R_1$, X and Y have the meanings already mentioned are also preferred.

Furthermore, trisazo/azoxy dyestuff mixtures which in the form of the free acid correspond to the formula

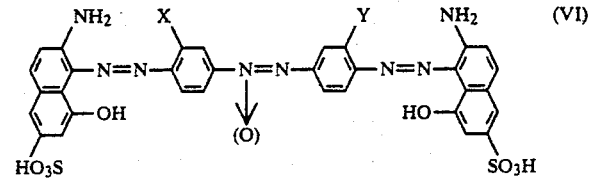
(VI)

in which
X and Y have the abovementioned meanings
are of particular importance.

R and $R_1$ preferably represent hydrogen or $C_1$–$C_4$-alkyl, which can for example by substituted by —OH, —COOH or —$SO_3H$. Examples which may be mentioned are methyl, ethyl, carboxymethyl, 2-hydroxyethyl and sulphoethyl.

X and Y preferably represent hydrogen, $C_1$–$C_4$-alkyl, especially methyl and ethyl, $C_1$–$C_4$-alkoxy, chlorine, bromine, hydroxyl, $C_1$–$C_4$-alkylsulphonyl, especially methylsulphonyl, optionally mono- or di-$C_1$–$C_4$-alkyl-substituted sulphamyl, COOH or —O—[$C_1$–$C_4$-alkyl]—COOH.

In the trisazo/azoxy dyestuff mixtures according to the invention, the dyestuffs can be in the form of the free acid or of its salts, especially the alkali metal salts and ammonium salts.

The preparation of the dyestuffs of the formulae (I) to (VI) is carried out by reducing monoazo compounds containing nitro groups, or mixtures of monoazo compounds containing nitro groups, of the formula (VII) or of the formula (VIII), or mixtures of the monoazo compounds of the formulae (VII) and (VIII), or (VII) and (IX) or (VIII) and (IX)

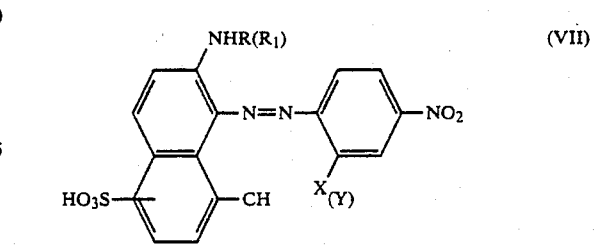
(VII)

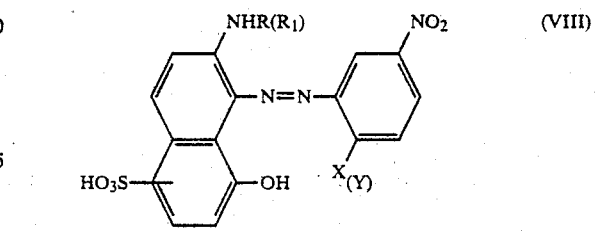
(VIII)

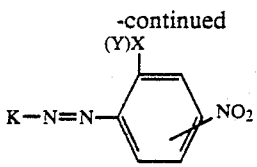

(IX)

wherein

R, $R_1$, X and Y, as well as K, have the meaning already given, in an aqueous alkaline medium at temperatures of between 30° and 90° C., by means of a reducing agent, such as, for example, glucose, hydrazine/catalyst, hydrazine/active charcoal, sodium sulphite solution, sodium sulphide and the like and at the same time effecting condensation to the trisazo and azoxy compounds (see Houben-Weyl, Volume 10/3, pages 346–354).

In a preferred embodiment, after the reduction has been carried out, possible secondary components are additionally oxidised to the trisazo/azoxy dyestuffs of of the formula (I) by means of one of the customary oxidising agents, for example chlorite bleach or hydrogen peroxide, if appropriate in the presence of metals. This subsequent oxidation as a rule leads to a relatively pure dyestuff.

The choice of optimum oxidation conditions and the amount of oxidising agent is in accordance with the nature and quality of the crude dyestuff formed, and must be established by simple preliminary experiments (compare also Example 1).

Suitable oxidising agents are all the reagents mentioned in Houben-Weyl, Volume 10/3, page 371 et seq., but preferably halogen-containing and oxygen-containing oxidising agents, such as, for example, halogens, hypochlorites, persulphates, perborates, permanganates, chromic acid, hydrogen peroxide, glacial acetic acid/hydrogen peroxide and glacial acetic acid/hydrogen peroxide/boric acid.

The use of chlorine, chlorite bleach or hydrogen peroxide under alkaline aqueous conditions, preferably at pH values of about 9 to about 12, proves particularly suitable.

Preferably, the oxidation is carried out at temperatures of about 30° C. to about 80° C.

The nitroazo compounds of the formula (VII), (VIII) or (IX) are prepared by coupling diazotised 3- or 4-nitroaminobenzenes of the formula (X) with optionally N-substituted amino-naphtholsulphonic acids of the formula (XI), under acid conditions, in the ortho-position to the amino group, or with a coupling component KH.

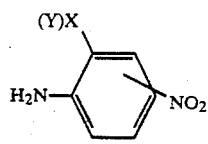
(X)

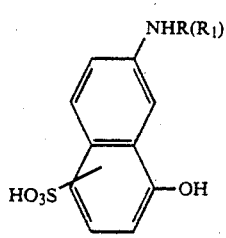
(XI)

X, Y, R, $R_1$ and K have the meanings already mentioned.

Examples of suitable compounds of the formula (X) are 3-nitroaniline, 4-nitroaniline, 2-methyl-5-nitroaniline, 2-methyl-4-nitroaniline, 2-methoxy-5-nitroaniline, 2-methoxy-4-nitroaniline, 2-ethoxy-5-nitroaniline, 2-ethoxy-4-nitroaniline, 2-chloro-5-nitroaniline, 2-chloro-4-nitroaniline, 2-bromo-4-nitroaniline, 2-hydroxy-4-nitroaniline, 2-methanesulphonyl-5-nitroaniline, 2-methanesulphonyl-4-nitroaniline, 2-(N-ethyl-N-phenyl)-sulphonamido-5-nitroaniline, 2-(N-ethyl-N-phenyl)-sulphonamido-4-nitroaniline, 2-amino-4-nitrobenzenesulphonic acid, 2-amino-4-nitro-benzoic acid, 2-amino-5-nitrobenzoic acid, (2′-amino-5′-nitrophenyl)-acetic acid and (2′-amino-5′-nitro)-phenoxy acetic acid.

Examples of suitable compounds of the formula (XI) are 7-amino-1-hydroxy-naphthalene-3-sulphonic acid, 7-amino-1-hydroxy-naphthalene-4-sulphonic acid, 7-N-methylamino-1-hydroxy-naphthalene-3-sulphonic acid, 7-N-ethylamino-1-hydroxy-naphthalene-3-sulphonic acid, 7-N-propylamino-1-hydroxy-naphthalene-3-sulphonic acid, 7-N-butylamino-1-hydroxy-naphthalene-3-sulphonic acid, 7-N-(2′-hydroxyethyl)-amino-1-hydroxy-naphthalene-3-sulphonic acid, 7-N-(2′-sulphoethyl)-amino-1-hydroxy-naphthalene-3-sulphonic acid, 7-N-(carboxymethyl)-amino-1-hydroxy-naphthalene-3-sulphonic acid and 7-N-(2′-carboxyethyl)-amino-1-hydroxy-naphthalene-3-sulphonic acid.

Selected examples of coupling components K-H are 5-amino-1-hydroxy-naphthalene-2-sulphonic acid, 6-amino-1-hydroxy-naphthalene-2-sulphonic acid, 5-amino-1-hydroxy-naphthalene-3-sulphonic acid, 6-amino-1-hydroxy-naphthalene-3-sulphonic acid, 4-hydroxy-7-(methylamino)-naphthalene-2-sulphonic acid, 7-(diethylamino)-4-hydroxy-naphthalene-2-sulphonic acid, 4-hydroxy-7-(phenylamino)-naphthalene-2-sulphonic acid, 7-(acetylamino)-4-hydroxy-naphthalene-2-sulphonic acid, 8-amino-1-hydroxy-naphthalene-3-sulphonic acid, 4-amino-5-hydroxy-naphthalene-1-sulphonic acid, 4-amino-5-hydroxy-naphthalene-1,6-disulphonic acid, 2-amino-5-hydroxy-naphthalene-1,7-sulphonic acid, 4-amino-5-hydroxy-naphthalene-1,7-sulphonic acid, 4-amino-5-hydroxy-naphthalene-2,7-disulphonic acid, 4-(ethylamino)-5-hydroxy-naphthalene-2,7-disulphonic acid, 7-amino-3-hydroxy-naphthalene-1-sulphonic acid, 4-amino-6-hydroxy-naphthalene-2-sulphonic acid, 6-amino-7-hydroxy-naphthalene-2-sulphonic acid, 5-amino-7-hydroxy-naphthalene-2-sulphonic acid, 4-amino-7-hydroxy-naphthalene-2-sulphonic acid, 6-amino-2-hydroxy-naphthalene-1,4-disulphonic acid, 8-amino-3-hydroxy-naphthalene-1,6-disulphonic acid, 8-amino-3-hydroxy-naphthalene-1,5-disulphonic acid, 7-amino-6-hydroxy-naphthalene-1,3-disulphonic acid, 1-hydroxy-naphthalene-2-disulphonic acid, 4-hydroxy-naphthalene-2-sulphonic acid, 4-hydroxy-naphthalene-1-sulphonic acid, 5hydroxy-naphthalene-1-sulphonic acid, 4-hydroxy-naphthalene-2,7-disulphonic acid, 4-hydroxy-naphthalene-2,6-disulphonic acid, 8-hydroxy-naphthalene-1,6-disulphonic acid, 3-hydroxy-naphthalene-1-sulphonic acid, 6-hydroxy-naphthalene-2-sulphonic acid, 7-hydroxy-naphthalene-2-sulphonic acid, 3-hydroxy-naphthalene-2,7-disulphonic acid, 3-hydroxy-naphthalene-2,6-disulphonic acid, 7-hydroxy-naphthalene-1,3-disulphonic acid, 4,5-dihydroxy-napthalene-2,7-disulphonic acid, 2-hydroxybenzoic acid, 3-hydroxybenzoic acid, 4-hydroxybenzoic acid, 5-chloro-2-hydroxybenzoic acid, 2-hydroxy-4-methyl-benzoic acid, 2,4-dihydroxybenzoic acid, 4-hydroxy- 1,3-benzenedicarboxylic acid, 2-hydroxy-benzenesulphonic acid, 3-hydroxy-benzenesulfonic acid, 4-hydroxy-benzenesulphonic acid and the like.

The dyestuffs of the formulae (I) to (VI) are used for dyeing fibre materials containing hydroxyl groups and fibre matrials containing amide groups, such as cotton, silk, natural and synthetic polyamide, paper and leather.

Thus, for example, dyestuffs according to formula (III), (V) and (VI) dye polyamide materials or cotton in violet, navy blue, greenish-tinged blue and black shades having good to very good fastness properties. (Details are to be found in the tables and examples).

Predominantly red and brown dyeings on textile materials are obtained on using dyestuffs of the formula (IV).

The dyestuffs furthermore have good build-up capacity and good combinability. They can be employed in mixtures with other dyestuffs, for example for black mixtures.

EXAMPLE 1

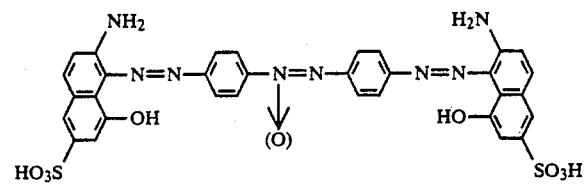

336 g of p-nitroaniline are diazotised with 780 ml of hydrochloric acid and 160 g of sodium nitrite at 8°–14° C., in aqueous solution (volume about 10 l). The excess nitrite is destroyed with amidosulphonic acid and the mixture is clarified. A solution of 552 g of 7-amino-1-hydroxy-naphthalene-3-sulphonic acid in 750 ml of water and 1.5 l of 20 percent strength sodium carbonate solution is added dropwise in the course of 1 hour at 10° C. The coupling mixture is stirred for 2 hours and neutralised with 900 ml of sodium carbonate solution. The reaction mixture is heated to 65° C. and brought to pH 12.5 with 900 ml of concentrated sodium hydroxide solution, and 300 g of glucose are added. The reduction takes place slightly exothermically, as shown by the temperature rising to 68° C. The reaction mixture is kept at 65°–70° C. for a further 30 minutes (pH: about 11.5). The product is salted out with 540 g of sodium chloride. To oxidise the red by-product, 1.3 l of chlorite bleach (about 13% of active chlorine) are added rapidly, at 65° C., and stirring is continued for 30 minutes. The mixture is rendered neutral by adding 450 ml of hydrochloric acid and, after addition of about 360 g of sodium chloride is stirred for a further hour, and the product is filtered off at 60° C. After isolation and drying, about 850 g of a dyestuff which dyes synthetic polyamide (polyamide 6) in a navy blue shade having very good general fastness properties ($\lambda_{mmax}$=573 nm) are obtained. (All $\lambda_{max}$ values relate to water as the solvent).

The dyestuffs characterised in the tables which follow are also prepared analogously to the procedure described in Example 1. (PA=synthetic polyamide, CO=cotton).

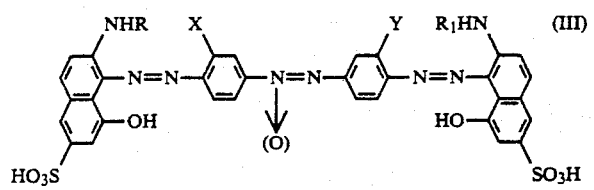

TABLE 1

| No. | R | $R_1$ | X | Y | Shade (dyed material) | $\lambda_{max}^{[nm]}$ |
|---|---|---|---|---|---|---|
| 2 | H | H | $CH_3$ | $CH_3$ | navy blue (PA) | 573 |
| 3 | H | H | Cl | Cl | navy blue (PA) | 595 |
| 4 | H | H | Br | Br | navy blue (PA) | 598 |
| 5 | H | H | $OCH_3$ | $OCH_3$ | greenish-tinged blue (PA) | 617 |
| 6 | H | H | $SO_2CH_3$ | $SO_2CH_3$ | blue (PA) | 608 |
| 7 | H | H | $SO_2-N-C_6H_5$<br>$\|$<br>$C_2H_5$ | $SO_2-N-C_6H_5$<br>$\|$<br>$C_2H_5$ | greenish-tinged blue (PA) | 623 |
| 8 | $CH_3$ | $CH_3$ | H | H | blue (PA) | 588 |
| 9 | $CH_2CH_2OH$ | $CH_2CH_2OH$ | H | H | blue (PA) | 591 |
| 10 | $CH_2CO_2H$ | $CH_2CO_2H$ | H | H | blue (PA) (Co) | |
| 11 | $CH_2CH_2SO_3H$ | $CH_2CH_2SO_3H$ | H | H | blue (Co) | 591 |
| 12 | $CH_3$ | $CH_3$ | Cl | Cl | navy blue (PA) | |
| 13 | H | H | $CO_2H$ | $CO_2H$ | blue (Co) | |
| 14 | H | H | $OCH_2-CO_2H$ | $OCH_2-CO_2H$ | greenish-tinged blue (Co) | |
| 15 | $CH_3$ | $CH_3$ | $SO_3H$ | $SO_3H$ | blue (Co) | |
| 16 | $CH_2CH_2OH$ | $CH_2CH_2OH$ | $SO_3H$ | $SO_3H$ | blue (Co) (paper) | |
| 17 | $CH_2CH_2SO_3H$ | $CH_2CH_2SO_3H$ | $OCH_3$ | $OCH_3$ | greenish-tinged blue (Co) (paper) | |
| 18 | $CH_2CO_2H$ | $CH_2CO_2H$ | $OCH_3$ | $OCH_3$ | greenish-tinged blue (CO) | |
| 19 | $CH_3$ | H | H | H | navy blue (PA) | |
| 20 | $CH_3$ | H | $CH_3$ | H | navy blue (PA) | |
| 21 | $CH_3$ | $CH_3$ | $OCH_3$ | $OCH_3$ | blue (PA) | |
| 22 | $CH_3$ | $CH_3$ | $SO_2N(C_2H_5)(C_6H_5)$ | $SO_2N(C_2H_5)(C_6H_5)$ | greenish-tinged blue (PA) | |
| 23 | $C_2H_5$ | $C_2H_5$ | H | H | navy blue (PA) | |
| 24 | $C_2H_5$ | $C_2H_5$ | Cl | Cl | navy blue (PA) | |

TABLE 1-continued

| No. | R | $R_1$ | X | Y | Shade (dyed material) | $\lambda_{max}^{[nm]}$ |
|---|---|---|---|---|---|---|
| 25 | $C_2H_5$ | $C_2H_5$ | $CO_2H$ | $CO_2H$ | blue (CO) (PA) | |

TABLE 2

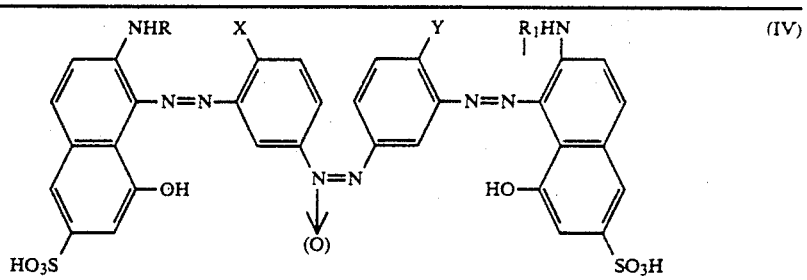

(IV)

| No. | R | $R_1$ | X | Y | Shade (dyed material) | $\lambda_{max}$ [nm] |
|---|---|---|---|---|---|---|
| 26 | H | H | H | H | red (PA) | 500 |
| 27 | H | H | $CH_3$ | $CH_3$ | bluish-tinged red (PA) | 504 |
| 28 | $CH_3$ | $CH_3$ | H | H | red (PA) | |
| 29 | $CH_3$ | $CH_3$ | $CH_3$ | $CH_3$ | bluish-tinged red (PA) | |
| 30 | $CH_2CH_2OH$ | $CH_2CH_2OH$ | H | H | bluish-tinged red (PA) | |
| 31 | $CH_2CH_2OH$ | $CH_2CH_2OH$ | $CH_3$ | $CH_3$ | bluish-tinged red (PA) | |
| 32 | $CH_2CO_2H$ | $CH_2CO_2H$ | H | H | bluish-tinged red (PA) (CO) | |
| 33 | $CH_2CO_2H$ | $CH_2CO_2H$ | $CH_3$ | $CH_3$ | bluish-tinged red (PA) (CO) | |
| 34 | $CH_2CH_2SO_3H$ | $CH_2CH_2SO_3H$ | H | H | bluish-tinged red (CO) | |
| 35 | $CH_2CH_2SO_3H$ | $CH_2CH_2SO_3H$ | $CH_3$ | $CH_3$ | bluish-tinged red (CO) | |

TABLE 3

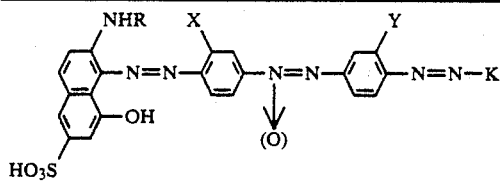

| No. | R | X | Y | K | Shade/$\lambda_{max}$[nm] |
|---|---|---|---|---|---|
| 36 | H | H | H | ![structure with $H_2N$, OH, $HO_3S$, $SO_3H$ on naphthalene] | blue (PA/CO)/582 |
| 37 | H | H | H | ![structure with $NH_2$, OH, $HO_3S$, $SO_3H$ on naphthalene] | navy blue (PA/CO)/587 |
| 38 | H | H | H | ![structure with OH, $H_2N$, $SO_3H$ on naphthalene] | violet (PA)/560 |
| 39 | H | H | H | ![structure with $NH_2$, OH, $SO_3H$, $SO_3H$ on naphthalene] | greenish-tinged blue (PA) blue (CO) 588 |
| 40 | H | H | H | ![structure with $NH_2$, HO, $SO_3H$ on naphthalene] | greyish blue (PA)/572 |

TABLE 3-continued

Structure: 8-NHR, 1-OH, 6-HO₃S naphthalene — N=N — (X-substituted phenyl, with optional →(O)) — N=N — (Y-substituted phenyl) — N=N—K

| No. | R | X | Y | K | Shade/λ_max[nm] |
|---|---|---|---|---|---|
| 41 | H | H | H | 2-amino-8-hydroxy-7-methyl-3,6-disulfonaphthalene (H₂N, HO₃S on one ring; OH, SO₃H, CH₃ on other) | blue-black (PA) violet (CO)/578 |
| 42 | H | H | H | 4-amino-5-hydroxy-6-methyl-3,7-disulfonaphthalene | blue (PA) reddish-tinged blue (CO)/578 |
| 43 | H | H | H | 1-hydroxy-2-methyl-3-sulfo-7-aminonaphthalene | violet (CO/PA)/561 |
| 44 | H | H | H | 4-amino-5-hydroxy-6-methyl-3,8-disulfonaphthalene | blue (PA/CO)/575 |
| 45 | H | H | H | 1-amino-8-hydroxy-7-methyl-6-sulfonaphthalene (HO-, CH₃ on one side) | blue (PA) violet (CO)/580 |
| 46 | H | OCH₃ | OCH₃ | 2-amino-8-hydroxy-methyl-3,6-disulfonaphthalene | strongly greenish-tinged blue (PA)/605 |
| 47 | H | OCH₃ | OCH₃ | 4-amino-5-hydroxy-6-methyl-3,7-disulfonaphthalene | blue (PA) reddish-tinged blue (CO)/585 |
| 48 | H | OCH₃ | OCH₃ | 1-amino-8-hydroxy-2,7-dimethyl-3,6-disulfonaphthalene | greenish-tinged blue (PA) blue (CO)/622 |

TABLE 4

Structure: naphthalene with NHR, OH, NaO₃S substituents, linked via N=N to a benzene ring (with X substituent), connected via N=N→(O) azoxy to another benzene ring (with Y substituent), then N=N–K.

| No. | R | X | Y | K | Shade/$\lambda_{max}$ [nm] |
|---|---|---|---|---|---|
| 49 | H | H | H | naphthalene with NH₂, OH, CH₃, HO₃S, SO₃H | reddish-tinged violet (PA) claret (CO)/527 |
| 50 | H | H | H | naphthalene with H₂N, CH₃, SO₃H, OH | red-brown (PA)/502 |
| 51 | H | H | H | naphthalene with NH₂, OH, CH₃, SO₃H, SO₃H | violet (PA/CO)/525 |
| 52 | H | H | H | naphthalene with NH₂, CH₃, OH, HO₃S | red-brown (PA)/502 |
| 53 | H | H | H | naphthalene with OH, NH₂, CH₃, HO₃S, SO₃H | bluish-tinged red (PA) red (CO)/515 |
| 54 | H | H | H | naphthalene with NH₂, CH₃, HO, SO₃H | red-brown (PA)/504 |

TABLE 5

Structure: naphthalene with NHR, OH, HO₃S substituents, linked via N=N to a benzene ring (with X), connected via N=N→(O) to another benzene ring (with Y), then N=N–K.

| No. | R | X | Y | K | Shade/$\lambda_{max}$ [nm] |
|---|---|---|---|---|---|
| 55 | H | H | H | naphthalene with H₂N, CH₃, OH, SO₃H | reddish-tinged violet (PA)/531 |
| 56 | H | H | H | naphthalene with OH, CH₃, HO₃S, NH₂ | navy blue (PA)/543 |
| 57 | H | OCH₃ | OCH₃ | naphthalene with H₂N, CH₃, OH, SO₃H | navy blue (PA)/539 |
| 58 | H | OCH₃ | OCH₃ | naphthalene with OH, CH₃, HO₃S, NH₂ | blue (PA)/540 |

We claim:

1. A trisazo/azoxy dyestuff mixture which in the form of the free acid correspond to the formula $$\text{(VI)}$$

(symmetrical structure: two amino-hydroxy-sulfo-naphthalene units linked through –N=N–C₆H₃(X)–N=N(→O)–C₆H₃(Y)–N=N–)

and X and Y denote H, C₁–C₄-alkoxy, chlorine, bromine, C₁–C₄-alkylsulphony, sulphamyl, mono-C₁–C₄-alkyl sulphamyl, di-C₁–C₄-alkyl sulphamyl, carboxyl or carboxy C₁–C₄-alkoxy.

* * * * *